United States Patent
Gupte et al.

(10) Patent No.: US 7,613,905 B2
(45) Date of Patent: Nov. 3, 2009

(54) PARTIAL REGISTER FORWARDING FOR CPUS WITH UNEQUAL DELAY FUNCTIONAL UNITS

(75) Inventors: Ajit Deepak Gupte, Karnataka (IN); Abhay Golecha, Rajastan (IN)

(73) Assignee: Texas Instruments Incorporated, Dallas, TX (US)

( * ) Notice: Subject to any disclaimer, the term of this patent is extended or adjusted under 35 U.S.C. 154(b) by 273 days.

(21) Appl. No.: 11/695,260

(22) Filed: Apr. 2, 2007

(65) Prior Publication Data

US 2007/0239971 A1  Oct. 11, 2007

Related U.S. Application Data

(60) Provisional application No. 60/744,367, filed on Apr. 6, 2006.

(51) Int. Cl.
*G06F 9/28* (2006.01)
(52) U.S. Cl. .................. 712/217; 712/218
(58) Field of Classification Search .............. 712/217
See application file for complete search history.

(56) References Cited

U.S. PATENT DOCUMENTS

| | | | | |
|---|---|---|---|---|
| 5,553,256 A * | 9/1996 | Fetterman et al. | ........... | 712/217 |
| 5,555,384 A * | 9/1996 | Roberts et al. | .............. | 712/216 |
| 5,761,476 A * | 6/1998 | Martell | ........................ | 712/219 |
| 6,341,324 B1 * | 1/2002 | Caulk et al. | ................. | 710/260 |
| 6,839,831 B2 * | 1/2005 | Balmer et al. | ............... | 712/218 |
| 2005/0251699 A1 * | 11/2005 | Jacobson | .................... | 713/400 |
| 2006/0069878 A1 * | 3/2006 | Aguilar et al. | .............. | 711/147 |

FOREIGN PATENT DOCUMENTS

EP  1124181 A1 *  8/2001

* cited by examiner

*Primary Examiner*—Eric Coleman
(74) *Attorney, Agent, or Firm*—Robert D. Marshall, Jr.; Wade J. Brady, III; Frederick J. Telecky, Jr.

(57) ABSTRACT

A data processing apparatus includes a register file and a plurality of functional units. At least one and not all the plurality of the functional units is a critical functional unit. Each critical functional unit supplies its output to a pipeline register. A comparator and multiplexer select a register input for each functional unit or the output of a corresponding pipeline register dependent. In the preferred embodiment, each critical functional unit has a throughput delay time longer than the average of throughput delay times of all functional units.

5 Claims, 4 Drawing Sheets

US 7,613,905 B2

PARTIAL REGISTER FORWARDING FOR CPUS WITH UNEQUAL DELAY FUNCTIONAL UNITS

CLAIM OF PRIORITY

This application claims priority under 35 U.S.C. 119(e)(1) to U.S. Provisional Application No. 60/744,367 filed Apr 6, 2006.

TECHNICAL FIELD OF THE INVENTION

The technical field of this invention is operand handling in a digital data processing apparatus.

BACKGROUND OF THE INVENTION

A typical central processing unit (CPU) architecture consists of many pipeline stages. The CPU executes instructions in a pipelined fashion. Consecutive instructions in the program flow are processed in consecutive pipeline stages of the CPU simultaneously. This process is similar to a manufacturing assembly line. This process can greatly enhance the instructions executed per second throughput of the CPU.

As number of pipeline stages increase, the serial logic delay in each stage can be reduced. This permits an increase in the CPU speed, resulting in greater throughput. If a pipeline stage takes 10 nS to execute, splitting the pipeline stage into two stages enables each of the spilt stages to execute in 5 nS. Generally the greater the number of pipeline stages, the better the throughput.

Sometimes it is difficult or undesirable to split a pipeline stage. For example, an adder functional unit operates in an execute pipeline stage. Splitting such an adder into multiple pipeline stages may cause a great increase in circuit area, because now a number of intermediate stage registers are required. Splitting the add operation into two pipeline stages has an impact on the program execution. It is now impossible to used the result of the add instruction in the immediate next instruction, because the add instruction now takes two pipeline stages. This may cause unacceptable compatibility problems or unacceptable performance.

As a result, some of CPU pipeline stages have a longer delay than others. Further, the maximum CPU clock speed is determined by the longest delay pipeline stage. Thus, the longest delay pipeline stage is a performance bottleneck.

This problem is aggravated in CPUs with multiple functional units, such as a very long instruction word (VLIW) architecture. In a VLIW architecture generally all of the multiple functional units may read data and store results into the same register file. This causes further increase in the logic delay in the execute pipeline stage due to multiplexing stages and excessive routing.

SUMMARY OF THE INVENTION

This invention is a data processing apparatus including a register file and a plurality of functional units. The plurality of units includes a critical functional unit subset of at least one and not all the plurality of functional units. Each functional unit responds to an instruction to receive data, perform an instruction-specified operation on the received data employing an instruction-specified one of the functional units, and output data to a register. Each critical functional unit supplies its output to a pipeline register. A comparator compares an indication of an operand register number of a current instruction of each functional unit and an indication of a destination register number of an immediately preceding instruction of each critical functional unit. A multiplexer is controlled to select a register input for each functional unit on no match and an output of a corresponding pipeline register when these match. In the preferred embodiment, each critical functional unit has a throughput delay time longer than the average of throughput delay times of all functional units. This provides a boost in performance by permitting the critical functional units more time to perform their operation.

In a further embodiment, the clock signal to the pipeline registers is delayed.

BRIEF DESCRIPTION OF THE DRAWINGS

These and other aspects of this invention are illustrated in the drawings, in which.

DETAILED DESCRIPTION OF PREFERRED EMBODIMENTS

A preferred embodiment of this invention will be described in this section. This invention is not limited to the preferred embodiment. It would be a straight forward task for one skilled in the art to apply the invention to a larger class of data processing architectures. This description corresponds to the Texas Instruments TMS320C6400 digital signal processor.

Figure 1:
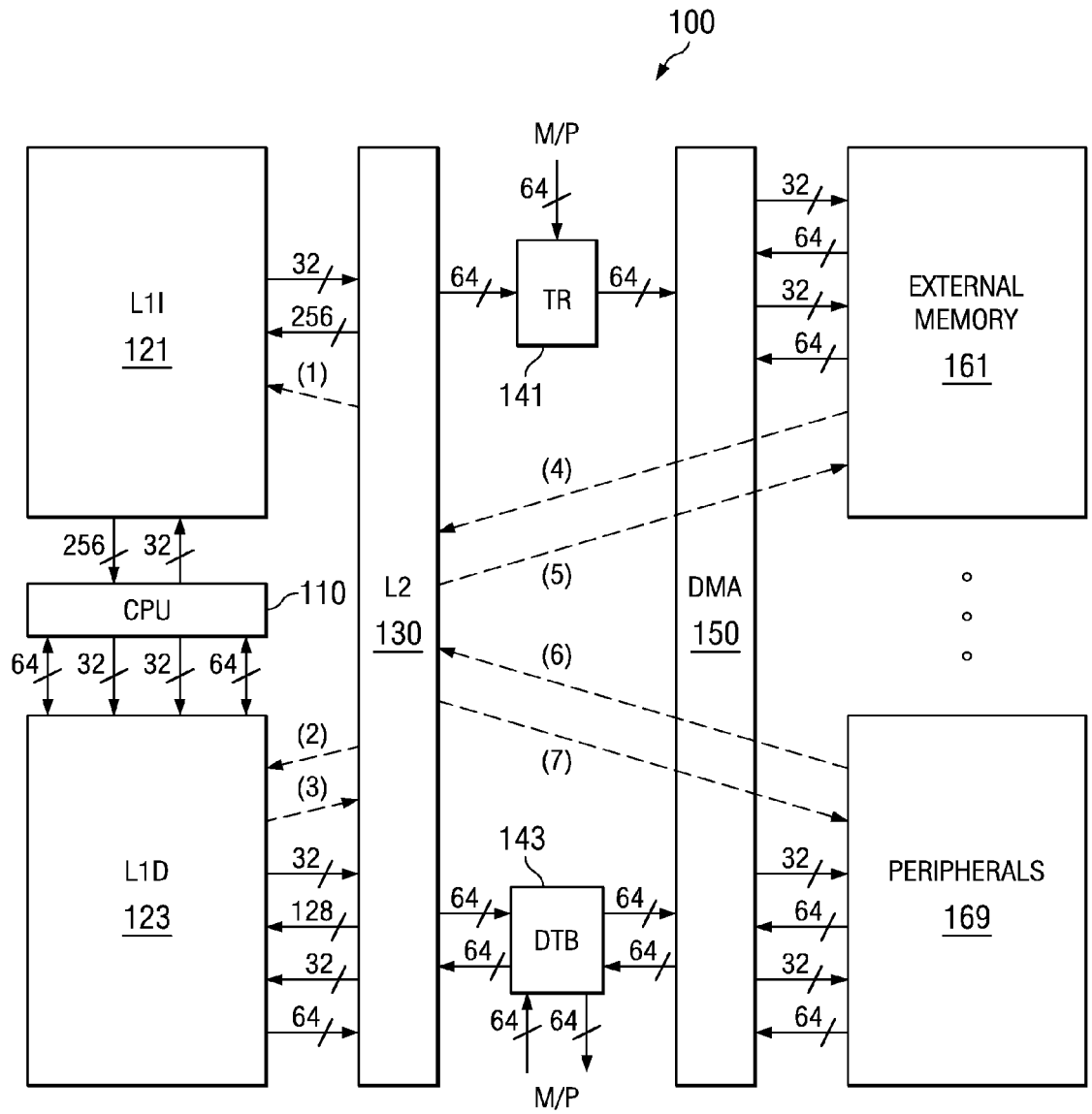
FIG. 1 illustrates the organization of a typical digital signal processor to which this invention is applicable (prior art)

FIG. 1 illustrates the organization of a typical digital signal processor system 100 to which this invention is applicable (prior art). Digital signal processor system 100 includes central processing unit core 110. Central processing unit core 110 includes the data processing portion of digital signal processor system 100. Central processing unit core 110 could be constructed as known in the art and would typically includes a register file, an integer arithmetic logic unit, an integer multiplier and program flow control units. An example of an appropriate central processing unit core is described below in conjunction with FIGS. 2 to 4.

Digital signal processor system 100 includes a number of cache memories. FIG. 1 illustrates a pair of first level caches. Level one instruction cache (L1I) 121 stores instructions used by central processing unit core 110. Central processing unit core 110 first attempts to access any instruction from level one instruction cache 121. Level one data cache (L1D) 123 stores data used by central processing unit core 110. Central processing unit core 110 first attempts to access any required data from level one data cache 123. The two level one caches are backed by a level two unified cache (L2) 130. In the event of a cache miss to level one instruction cache 121 or to level one data cache 123, the requested instruction or data is sought from level two unified cache 130. If the requested instruction or data is stored in level two unified cache 130, then it is supplied to the requesting level one cache for supply to central processing unit core 110. As is known in the art, the requested instruction or data may be simultaneously supplied to both the requesting cache and central processing unit core 110 to speed use.

Level two unified cache 130 is further coupled to higher level memory systems. Digital signal processor system 100 may be a part of a multiprocessor system. The other processors of the multiprocessor system are coupled to level two unified cache 130 via a transfer request bus 141 and a data transfer bus 143. A direct memory access unit 150 provides the connection of digital signal processor system 100 to external memory 161 and external peripherals 169.

Figure 2:
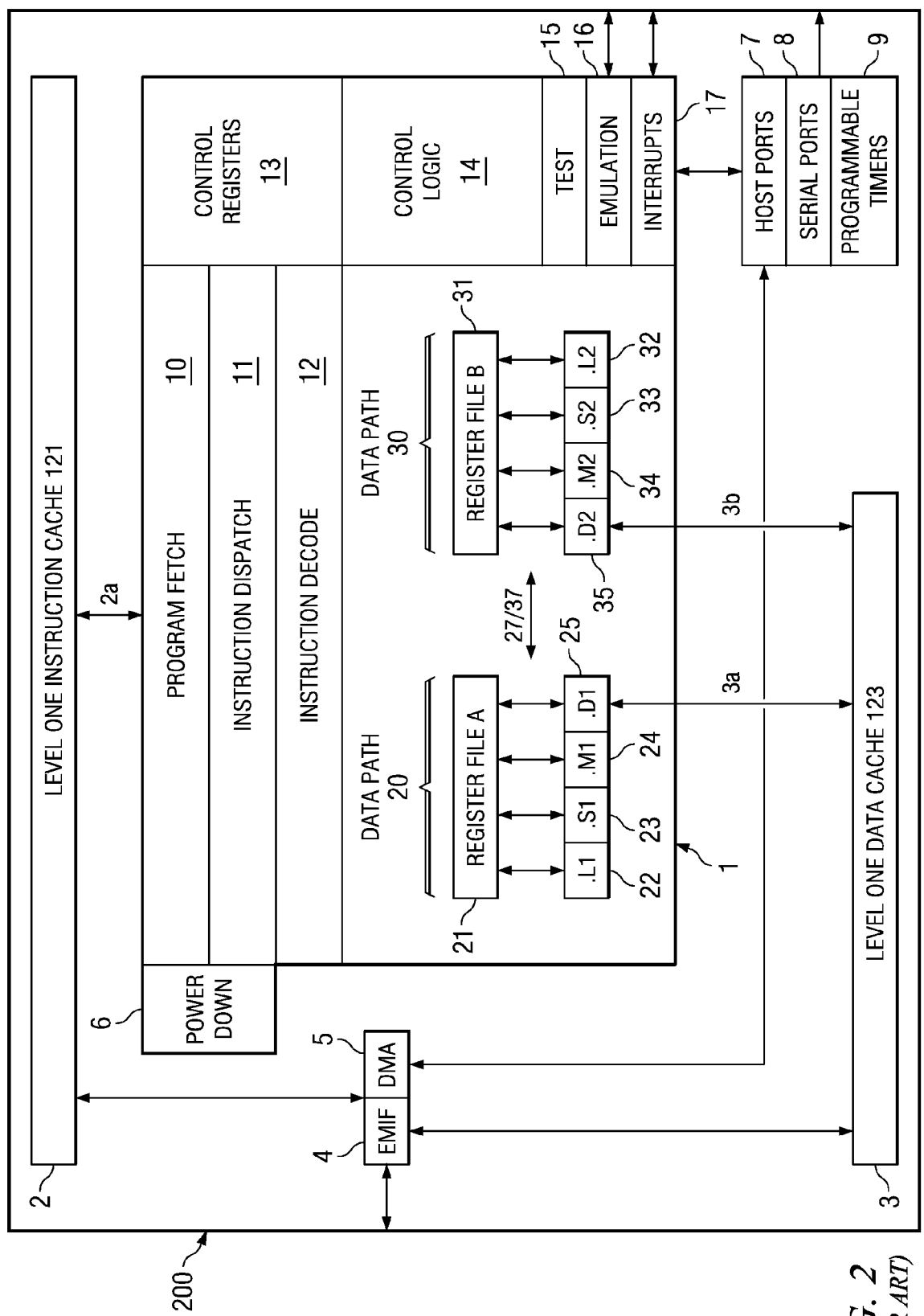
FIG. 2 illustrates details of a very long instruction word digital signal processor core suitable for use in FIG. 1 (prior art)

FIG. 2 is a block diagram illustrating details of a digital signal processor integrated circuit 200 suitable but not essential for use in this invention (prior art). The digital signal processor integrated circuit 200 includes central processing unit 1, which is a 32-bit eight-way VLIW pipelined processor. Central processing unit 1 is coupled to level 1 instruction cache 121 included in digital signal processor integrated circuit 200. Digital signal processor integrated circuit 200 also includes level one data cache 123. Digital signal processor integrated circuit 200 also includes peripherals 4 to 9. These peripherals preferably include an external memory interface (EMIF) 4 and a direct memory access (DMA) controller 5. External memory interface (EMIF) 4 preferably supports access to supports synchronous and asynchronous SRAM and synchronous DRAM. Direct memory access (DMA) controller 5 preferably provides 2-channel auto-boot loading direct memory access. These peripherals include power-down logic 6. Power-down logic 6 preferably can halt central processing unit activity, peripheral activity, and phase lock loop (PLL) clock synchronization activity to reduce power consumption. These peripherals also include host ports 7, serial ports 8 and programmable timers 9.

Central processing unit 1 has a 32-bit, byte addressable address space. Internal memory on the same integrated circuit is preferably organized in a data space including level one data cache 123 and a program space including level one instruction cache 121. When off-chip memory is used, preferably these two spaces are unified into a single memory space via the external memory interface (EMIF) 4.

Level one data cache 123 may be internally accessed by central processing unit 1 via two internal ports 3a and 3b. Each internal port 3a and 3b preferably has 32 bits of data and a 32-bit byte address reach. Level one instruction cache 121 may be internally accessed by central processing unit 1 via a single port 2a. Port 2a of level one instruction cache 121 preferably has an instruction-fetch width of 256 bits and a 30-bit word (four bytes) address, equivalent to a 32-bit byte address.

Central processing unit 1 includes program fetch unit 10, instruction dispatch unit 11, instruction decode unit 12 and two data paths 20 and 30. First data path 20 includes four functional units designated L1 unit 22, S1 unit 23, M1 unit 24 and D1 unit 25 and thirty two 32-bit A registers forming register file 21. Second data path 30 likewise includes four functional units designated L2 unit 32, S2 unit 33, M2 unit 34 and D2 unit 35 and thirty two 32-bit B registers forming register file 31. The functional units of each data path access the corresponding register file for their operands. There are two cross paths 27 and 37 permitting access to one register in the opposite register file each pipeline stage. Central processing unit 1 includes control registers 13, control logic 14, and test logic 15, emulation logic 16 and interrupt logic 17.

Program fetch unit 10, instruction dispatch unit 11 and instruction decode unit 12 recall instructions from level one instruction cache 121 and deliver up to eight 32-bit instructions to the functional units every instruction cycle. Processing occurs in each of the two data paths 20 and 30. As previously described above each data path has four corresponding functional units (L, S, M and D) and a corresponding register file containing thirty two 32-bit registers. Each functional unit is controlled by a 32-bit instruction. The data paths are further described below. A control register file 13 provides the means to configure and control various processor operations.

Figure 3:
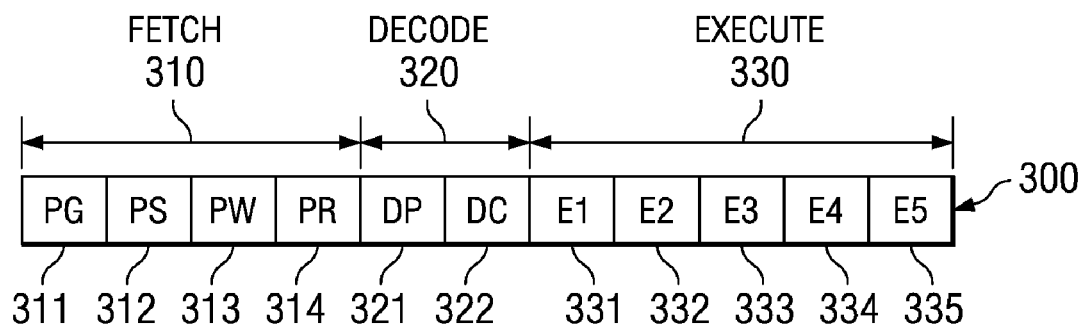
FIG. 3 illustrates the pipeline stages of the very long instruction word digital signal processor core illustrated in FIG. 2 (prior art)

FIG. 3 illustrates the pipeline stages 300 of digital signal processor core 110 (prior art). These pipeline stages are divided into three groups: fetch group 310; decode group 320; and execute group 330. All instructions in the instruction set flow through the fetch, decode, and execute stages of the pipeline. Fetch group 310 has four phases for all instructions, and decode group 320 has two phases for all instructions. Execute group 330 requires a varying number of phases depending on the type of instruction.

The fetch phases of the fetch group 310 are: Program address generate phase 311 (PG); Program address send phase 312 (PS); Program access ready wait stage 313 (PW); and Program fetch packet receive stage 314 (PR). Digital signal processor core 110 uses a fetch packet (FP) of eight instructions. All eight of the instructions proceed through fetch group 310 together. During PG phase 311, the program address is generated in program fetch unit 10. During PS phase 312, this program address is sent to memory. During PW phase 313, the memory read occurs. Finally during PR phase 314, the fetch packet is received at CPU 1.

The decode phases of decode group 320 are: Instruction dispatch (DP) 321; and Instruction decode (DC) 322. During the DP phase 321, the fetch packets are split into execute packets. Execute packets consist of one or more instructions which are coded to execute in parallel. During DP phase 322, the instructions in an execute packet are assigned to the appropriate functional units. Also during DC phase 322, the source registers, destination registers and associated paths are decoded for the execution of the instructions in the respective functional units.

The execute phases of the execute group 330 are: Execute 1 (E1) 331; Execute 2 (E2) 332; Execute 3 (E3) 333; Execute 4 (E4) 334; and Execute 5 (E5) 335. Different types of instructions require different numbers of these phases to complete. These phases of the pipeline play an important role in understanding the device state at CPU cycle boundaries.

During E1 phase 331, the conditions for the instructions are evaluated and operands are read for all instruction types. For load and store instructions, address generation is performed and address modifications are written to a register file. For branch instructions, branch fetch packet in PG phase 311 is affected. For all single-cycle instructions, the results are written to a register file. All single-cycle instructions complete during the E1 phase 331.

During the E2 phase 332, for load instructions, the address is sent to memory. For store instructions, the address and data are sent to memory. Single-cycle instructions that saturate results set the SAT bit in the control status register (CSR) if saturation occurs. For single cycle 16 by 16 multiply instructions, the results are written to a register file. For M unit non-multiply instructions, the results are written to a register file. All ordinary multiply unit instructions complete during E2 phase 322.

During E3 phase 333, data memory accesses are performed. Any multiply instruction that saturates results sets the SAT bit in the control status register (CSR) if saturation occurs. Store instructions complete during the E3 phase 333.

During E4 phase 334, for load instructions, data is brought to the CPU boundary. For multiply extension instructions, the results are written to a register file. Multiply extension instructions complete during the E4 phase 334.

During E5 phase 335, load instructions write data into a register. Load instructions complete during the E5 phase 335.

Figure 4:
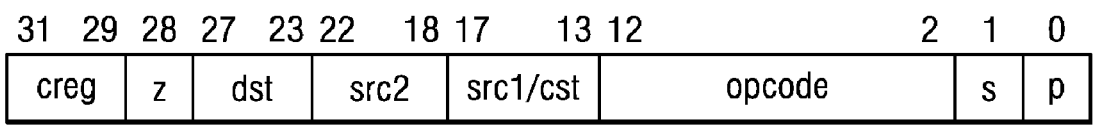
FIG. 4 illustrates the instruction syntax of the very long instruction word digital signal processor core illustrated in FIG. 2 (prior art)

FIG. 4 illustrates an example of the instruction coding of instructions used by digital signal processor core 110 (prior art). Each instruction consists of 32 bits and controls the operation of one of the eight functional units. The bit fields are defined as follows. The creg field (bits 29 to 31) is the conditional register field. These bits identify whether the instruction is conditional and identify the predicate register. The z bit (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field is encoded in the instruction opcode as shown in Table 1.

TABLE 1

| Conditional Register | creg | | | z |
|---|---|---|---|---|
| | 31 | 30 | 29 | 28 |
| Unconditional | 0 | 0 | 0 | 0 |
| Reserved | 0 | 0 | 0 | 1 |
| B0 | 0 | 0 | 1 | z |
| B1 | 0 | 1 | 0 | z |
| B2 | 0 | 1 | 1 | z |
| A1 | 1 | 0 | 0 | z |
| A2 | 1 | 0 | 1 | z |
| A0 | 1 | 1 | 0 | z |
| Reserved | 1 | 1 | 1 | x |

Note that "z" in the z bit column refers to the zero/not zero comparison selection noted above and "x" is a don't care state. This coding can only specify a subset of the 32 registers in each register file as predicate registers. This selection was made to preserve bits in the instruction coding.

The dst field (bits 23 to 27) specifies one of the 32 registers in the corresponding register file as the destination of the instruction results.

The scr2 field (bits 18 to 22) specifies one of the 32 registers in the corresponding register file as the second source operand.

The scr1/cst field (bits 13 to 17) has several meanings depending on the instruction opcode field (bits 3 to 12). The first meaning specifies one of the 32 registers of the corresponding register file as the first operand. The second meaning is a 5-bit immediate constant. Depending on the instruction type, this is treated as an unsigned integer and zero extended to 32 bits or is treated as a signed integer and sign extended to 32 bits. Lastly, this field can specify one of the 32 registers in the opposite register file if the instruction invokes one of the register file cross paths 27 or 37.

The opcode field (bits 3 to 12) specifies the type of instruction and designates appropriate instruction options. A detailed explanation of this field is beyond the scope of this invention except for the instruction options detailed below.

The s bit (bit 1) designates the data path 20 or 30. If s=0, then data path 20 is selected. This limits the functional unit to L1 unit 22, S1 unit 23, M1 unit 24 and D1 unit 25 and the corresponding register file A 21. Similarly, s=1 selects data path 20 limiting the functional unit to L2 unit 32, S2 unit 33, M2 unit 34 and D2 unit 35 and the corresponding register file B 31.

The p bit (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to eight instructions. Each instruction in an execute packet must use a different functional unit.

Figure 5:
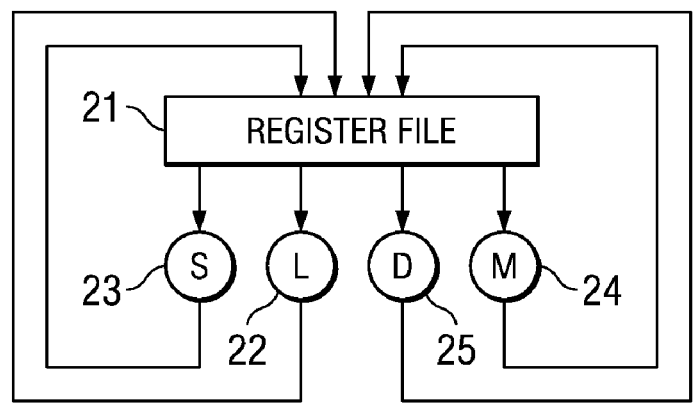
FIG. 5 illustrates operand handling for one data path of the very long instruction word digital signal processor core illustrated in FIG. 2 (prior art)

FIG. 5 illustrates operand flow in example data path 20 shown in FIG. 2. Functional units L unit 22, S unit 23, M unit 24 and D unit 25 recall operands for their operations from register file A 21. Following execution of the corresponding instruction specified operation, functional units L unit 22, S unit 23, M unit 24 and D unit 25 supply the results of their respective operations to register file A 21 for storage. Similar operand data flow occurs separately for data path 30.

As noted above, there are some operations specified by single-cycle instructions. In these single-cycle instructions the operand fetch from register file 21, data processing operation within the corresponding functional unit L unit 22, S unit 23, M unit 24 or D unit 25, and storage of the result back into register file 21 all occur within execution E1 phase 331. For these single-cycle instructions the result would be stored in register file A 21 and available for use as an operand. Thus an instruction operating in the next successive instruction cycle can use this result as an input operand.

Other operations are not specified by these single-cycle instructions. In these other operations, the functional unit result is not stored in register file A 21 until a later pipeline stage, such as E2 phase 332, E3 phase 333, E4 phase 334 or E5 phase 335. In these cases the resultant is not available for use in the next successive instruction cycle. Instead, the data is only available in some later instruction cycle. Which later instruction cycle can use this resultant data depends upon which execute phase stores the resultant into register file A 21. Such latencies must be taken into account when scheduling instruction execute packets. Depending on the particular program, these latencies may result in some functional units being idle during some cycles because resultants are not available.

Figure 6:
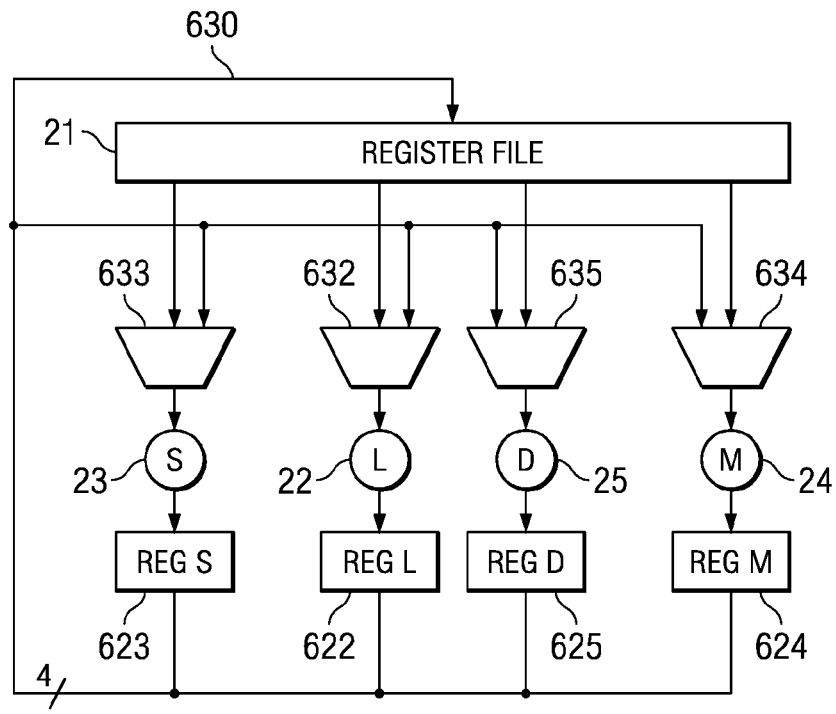
FIG. 6 illustrates complete crossbar data forwarding for one data path of the very long instruction word digital signal processor core illustrated in FIG. 2 (prior art)

FIG. 6 illustrates a prior art technique called data forwarding used to reduce problems with this operational latency. Such data forwarding is a widely used technique. As shown in FIG. 6, each functional unit L unit 22, S unit 23, M unit 24 and D unit 25 supplies resultant data to a corresponding pipeline register. S unit 23 supplies its resultant to S pipeline register 623. L unit 22 supplies its resultant to L pipeline register 622. D unit 25 supplies its resultant to D pipeline register 625. M unit 24 supplies its resultant to M pipeline register 625. A forwarding bus 630 supplies the contents of the S pipeline register 623, the L pipeline register 622, the D pipeline register 625 and the M pipeline register 625 to both register file A 21 for storage and to a set of forwarding multiplexers 633, 632, 635 and 634. Each forwarding multiplexer 633, 632, 635 and 634 also receives data recalled from register file A 21.

Data on forwarding bus 630 is stored in register file A 21 unconditionally. Data on forwarding bus 630 may be selected by forwarding multiplexers 633, 632, 635 and 634 to supply an input operand to a corresponding functional unit. In FIG. 6, data from the S pipeline register 623, the L pipeline register 622, the D pipeline register 625 and the M pipeline register 625 are available at the forwarding multiplexers 633, 632, 635 and 634 one pipeline stage before data recalled from register file A 21. Instruction scheduling includes information needed to determine whether an input operand is available for recall from register file A 21 or on forwarding bus 630. If the correct data is available on forwarding bus 630, then the corresponding forwarding multiplexer 633, 632, 635 or 634 selects this data from the originating functional unit rather than data recalled from register file A 21. In this case, data recalled from register file A 21 is incorrect because it will be overwritten by data on forwarding bus 630. For each instruction cycle, the destination register of each functional unit S unit 23, L unit 22, D unit 25 and M unit 24 is compared with the source register for the corresponding functional unit. If any destination register equal a source register, then the multiplexer 623, 622, 625 or 624 selects the data on forwarding bus 630. Otherwise each multiplexer selects the data recalled from register file A 21. This operand forwarding technique enables tighter scheduling by reducing by one the number of pipeline stages before data is available.

FIG. 4 illustrates that instructions for the example very long instruction word digital signal processor illustrated in FIGS. 1 and 2 typically include two input operands. These are scr1 located within the corresponding register file at a location noted by bits 13 to 17 of the instruction and scr2 located within the corresponding register file at a location noted by bits 18 to 22 of the instruction. It is known in the art to provide a forwarding multiplexer for each of the two input operands for each functional unit. Thus either input operand could be forwarded directly from a pipeline register rather than recalled from register file A 21. FIG. 6 illustrates only a single multiplexer for a single operand for clarity. However, those skilled in the art would realize that a multiplexer is required for both operand inputs of each functional unit.

In the circuit of FIG. 6, the width of forwarding bus 630 is 4 and the width of the forwarding multiplexers is 5. This reduces the effectiveness of the data forwarding technique. In the complete crossbar scheme illustrated in FIG. 6, the benefit obtained by forwarding register is more or less lost by delay in the forwarding multiplexers. The primary advantage of this technique is that the fanout of the results of the functional units is not in the critical path. This fanout happens in the second cycle. Accordingly, the total operand forwarding illustrated in FIG. 6 is not a complete solution to the problem of operand availability.

Figure 7:
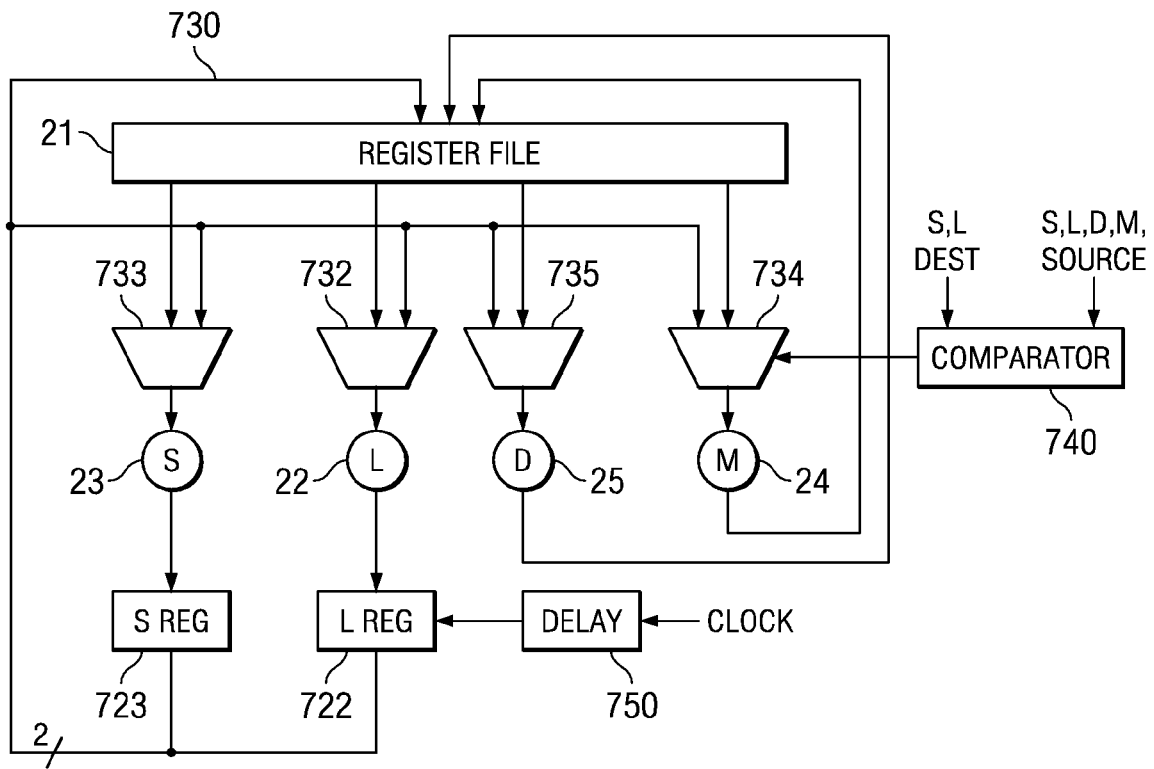
FIG. 7 illustrates partial data forwarding for one data path of the very long instruction word digital signal processor core illustrated in FIG. 2 according to an embodiment of this invention.

FIG. 7 illustrates the technique of this invention. As illustrated in FIG. 7, this invention uses partial data forwarding. The result of S unit 23 is stored in S pipeline register 723. The result of L unit 22 is stored in L pipeline register 722. Forwarding bus 730 supplies data from these pipeline registers to register file 21 for storage and to forwarding multiplexers 733, 732, 735 and 734 for optional selection as an operand for respective S unit 23, L unit 22, D unit 25 and M unit 24. Comparator 740 compares the destination register numbers of S unit 23 and L unit 22 against the source register numbers of S unit 23, L unit 22, D unit 25 and M unit 24. Whenever one of the destination register numbers matches one of source register numbers, comparator 740 controls the selection of the corresponding forwarding multiplexers 733, 732, 735 or 734 to select the input operand from the forwarding bus 730. If there is no such match, comparator 740 controls the selection of the corresponding forwarding multiplexers 733, 732, 735 and 734 to select the input operand from register file A 21.

Selection of which functional units to provide operand forwarding is determined as shown in the following example. This invention identifies functional units that have longer delay than the average pipeline delay. As an example, suppose the four functional units S unit 23, L unit 22, D unit 25 and M unit 24 have respective delays of 13 nS, 12 nS, 7 nS and 5 nS. Assume the delay in multiplexing and fanout logic that selects the outputs from S unit 23, L unit 22, D unit 25 and M unit 24 and fans out to appropriate register within register file A 21 is 4 nS. Thus, the total execute stage delay for respective functional unit S unit 23, L unit 22, D unit 25 and M unit 24 have respective delays of 17 nS, 16 nS, 11 nS and 9 nS. Assume that the longest pipeline delay other than the execute stage is 15 nS. Thus in this example, S unit 23 and L unit 22 are performance bottlenecks for this CPU.

In this example, pipeline registers are inserted following S unit 23 and L unit 22 to store their results. This eliminates the register file multiplexing and fanout delay in the data paths of these units. Note that forwarding multiplexers 733, 732, 735 and 734 add delay in the functional unit critical paths. This takes away some of the benefit gained by the forwarding register. However, the benefit gained by the forwarding register is larger than the loss due to forwarding multiplexer. The greater the number of non-critical functional units, those not having pipeline registers such as S pipeline register 723 and L pipeline register 722, the bigger the advantage due data forwarding. Let the delay of forwarding multiplexers 732, 733, 734, 735 be 2 nS. The longest delay paths in the execute stage become 15 nS and 14 ns respectively. This is the same as the longest pipeline delay in other stages according to this example. Thus functional units S unit 23 and L unit 22 are no longer bottlenecks.

In this example, the results of S unit 23 and L unit 22 are written back to register file A 21 one pipeline stage later. Forwarding multiplexers 733, 732, 735 and 734 take care of the situation that an immediate next instruction might need the result produced by the instruction operating on S unit 23 or L unit 22. This forwards the output of S pipeline register 723 and L pipeline register 722 to all functional units.

This forwarding technique opens a register write hazard that must be considered. Suppose L unit 22 writes to a register in register file A 21 at the end of cycle 1, while D unit 25 writes to the same register at the end of cycle 2. In this partial data forwarding technique, both writes to register file A 21 occur at the same time. In this case, write by D unit 25 takes priority over the write by L unit 22. Thus only the write by D unit 25 should succeed.

FIG. 7 illustrates a further aspect of this invention. The clock signal to forwarding registers 723 and 722 is delayed in delay 750. There are two kinds of paths through S unit 23 and L unit 22. The first path includes: register file A 21; the corresponding forwarding multiplexer 733 or 732; the functional unit S unit 23 or L unit 22; and the corresponding forwarding register 723 or 722. The second path includes: one of forwarding register 723 or 722; the corresponding forwarding multiplexer 733 or 732; the functional unit S unit 23 or L unit 22; and the corresponding forwarding register 723 or 722. The first path starts in register file A 21. Register file A 21 typically consists of many registers. In this example there are 32 such data registers. Therefore selecting an output from register file A 21 involves the logic delay of 32:1 multiplexer. In the typical case, this first path will be longer than path the second data path. The delay of the clock to S pipeline register 723 and L pipeline register 722 gives this first path more time to complete. The length of the second path remains the same. This gives another boost in the performance of the execute stage pipeline. Let the pipeline stage delay be 20 nS. Delaying the clock to the S pipeline register 723 and L pipeline register 722 by 1 nS has following effect. This inserts 21 nS into the critical path register file to forwarding multiplexer to S or L function unit to pipeline register. This reduces the path pipeline register to forwarding multiplexer to D or M functional unit to register file to only 19 nS. This is acceptable since this path is not critical. The path from pipeline register to forwarding multiplexer to S or L functional unit to pipeline register remains 20 nS.

This invention has a number of advantages over the full data forwarding illustrated in FIG. 6. Since the data forwarding is implemented partially in only critical functional units, the width of forwarding multiplexers 733, 732, 735 and 734 are smaller than the width of forwarding multiplexers 633, 632, 635 and 633. This reduced width enables the forwarding multiplexers of this invention to operate faster giving a greater performance benefit. By not implementing a complete crossbar, the number of forwarding paths 730 is smaller than the number of forwarding paths 630. This decreases the amount of verification required for the forwarding technique. Delaying the clock to S pipeline register 723 and L pipeline register 722 eliminates the read multiplexing register file delay from the critical path. This gives a further performance benefit. This makes the critical path delay less dependent on register file size. Thus doubling the size of the register file will not change the critical path provided there is sufficient clock latency on the pipeline registers 723 and 722. The forwarding registers and associated control logic require integrated circuit area. This invention implements data forwarding only for the necessary functional units, reducing the area overhead due compared to the complete crossbar data forwarding scheme. Thus this invention is more area efficient than the prior art.

What is claimed is:

1. A data processing apparatus comprising:
a register file comprising a plurality of registers, each of said plurality of registers having a corresponding register number;
a plurality of functional units connected to said register file, said plurality of functional units including a critical functional unit subset of at least one and not all said plurality of functional units, each functional unit responsive within a single clock cycle to an instruction to
receive data from one of said plurality of registers corresponding to an instruction-specified operand register number at a operand input,
perform an instruction-specified operation on said received data, and
output data to one of said plurality of registers corresponding to an instruction-specified destination register number from an output;
a number of pipeline registers equal in number to said critical functional units, each pipeline register receiving and storing output data from a corresponding one of said critical functional units;
a comparator receiving an indication of said operand register number of a current instruction of each of said plurality of functional units and an indication of said destination register number of an immediately preceding instruction of each critical functional unit, said comparator indicating whether an operand register number of said current instruction matches a destination register number of said immediately preceding instruction; and
a plurality of register file bypass multiplexers equal in number to said plurality of functional units, each register file bypass multiplexer having a first input receiving data from said register corresponding to said operand register number of said current instruction, a number of second inputs equal to a number of said pipeline registers each connected to a corresponding one of said pipeline registers receiving data from said corresponding critical functional unit and an output supplying an operand to said operand input of said corresponding functional unit, said multiplexer selecting said data from said register corresponding to said operand number of said current instruction if said comparator fails to indicate a match and selecting a corresponding one of said second outputs from a pipeline register if said comparator indicates a match.

2. The data processing apparatus of claim 1, wherein:
each of said plurality of functional units has a throughput delay time for performing instruction-specified operations; and
each of said at least one critical functional units has a throughput delay time longer than an average of said throughput delay times of all of said plurality of functional units.

3. The data processing apparatus of claim 1, wherein:
said register file, said plurality of functional units, said pipeline registers, said comparator and said plurality of register file bypass multiplexers operate synchronously with a clock signal; and
said data processing apparatus further includes a delay circuit receiving said clock signal and supplying a delayed clock signal having a delay less than one clock cycle to each of said pipeline registers.

4. The data processing apparatus of claim 1, wherein:
each of said pipeline registers is connected to said register file to store data stored in said pipeline register into a data register within said register file corresponding to an instruction-specified destination register number.

5. The data processing apparatus of claim 4, wherein:
said register file operates to provide data write priority to store data from a functional unit not a critical functional unit when said destination register number of a current instruction of a functional unit not a critical functional unit equals a destination register number of an immediately preceding instruction of a critical functional unit.

* * * * *